APPARATUS FOR DETECTING AND CORRECTING AMPLITUDE DISTORTION

Filed Sept. 14, 1951 2 Sheets-Sheet 1

INVENTORS: L.E. HUNT
J.P. SCHAFER
BY H. O. Wright
ATTORNEY

March 13, 1956 L. E. HUNT ET AL 2,738,417
APPARATUS FOR DETECTING AND CORRECTING
AMPLITUDE DISTORTION
Filed Sept. 14, 1951 2 Sheets-Sheet 2

INVENTORS: L. E. HUNT
J. P. SCHAFER
BY H. O. Wright
ATTORNEY

United States Patent Office 2,738,417
Patented Mar. 13, 1956

2,738,417

APPARATUS FOR DETECTING AND CORRECTING AMPLITUDE DISTORTION

Loyd E. Hunt, Oakhurst, and John P. Schafer, Elberon, N. J., assignors to Bell Telephone Laboratories, Incorporated, New York, N. Y., a corporation of New York Application September 14, 1951, Serial No. 246,694
6 Claims. (Cl. 250—6)

This invention relates to a method of and apparatus for detecting and correcting amplitude distortion at radio and/or intermediate frequencies in a frequency modulation transmission system in which amplitude compression is anticipated at many points along the system. More particularly, since amplitude versus frequency distortion at radio and/or intermediate frequencies in such a system cannot practicably be detected or measured directly without the virtually impossible step of eliminating amplitude compression at all points along the system, the present invention provides a method of detection and correction which is based upon observation of the distortion in the baseband or video signal at the receiving terminal of the system when radio or intermediate frequency signals having predetermined characteristics are transmitted over the system.

Typical systems in connection with which the method of the invention can be effectively employed are, by way of example, the one described in a paper entitled "A broad band microwave relay system between New York and Boston" by G. N. Thayer, A. A. Roetkin, R. W. Friis and A. L. Durkee, published in the Proceedings of the I. R. E., volume 37, for February 1949, at pages 183 to 188, inclusive, and that known as the "TD–2 Radio Relay System" described in an article by C. E. Clutts, published in the Bell Laboratories Record for October 1950 at pages 442 to 447, inclusive. Detailed descriptions of component apparatus units developed for use in such radio relay systems are given in an article entitled "Microwave repeater research" by H. T. Friis, published in the Bell System Technical Journal for April 1948, volume 27, No. 2, at pages 183 to 246, inclusive. Of interest in this connection also is the article entitled "Repeaters for the TD–2 Radio Relay System" by G. R. Frantz, published in the Bell Laboratories Record for August 1951, pages 356 to 360.

A principal object of the invention is to provide a method and apparatus for detecting and correcting amplitude distortion at radio and/or intermediate frequencies in a frequency modulation long-haul microwave relay system in which amplitude compression may be encountered at many points along the system.

Other and further objects will become apparent during the course of the following description and from the appended claims.

As is well understood by those skilled in the art, in a long-haul transmission system employing numerous repeater (or amplifying) stations, amplitude limiting or compression may be encountered at numerous points along the system so that amplitude variations with frequency in the transmission characteristics of the system at radio and/or intermediate frequencies, are likely to be masked or obliterated, to a large extent, in so far as the possibility of directly measuring the effective over-all amplitude variations of the system is concerned.

It is further well known to those skilled in the art that if a frequency modulated signal is transmitted over a transmission path having substantial amplitude variations with frequency over the frequency region of interest, that distortion, due to varations in the relationship between sideband and carrier frequency amplitudes, will be introduced into the frequency modulated signal, which distortion will appear at the discriminator as spurious frequency modulation. Such distortion will, of course, not be eliminated by subsequent amplitude limiting.

Although the individual apparatus units of such a system are initially adjusted to be as free from amplitude distortion as possible, small variations in the order of a few tenths of a decibel are inevitably introduced by the majority of such units and the cumulative effect of such variations may ultimately amount to as much as five or ten decibels in long distance or "long-haul" systems of the type described in the above-mentioned articles by Thayer et al. and Clutts.

Applicants have found that the presence of amplitude distortion at radio and/or intermediate frequencies in a complex system of the type described in the above-mentioned articles, is readily detected by passing a simple, frequency-swept, test video signal through the system, using successively a number of intermediate carrier frequencies spaced at intervals over the range of intermediate frequencies employed for regular transmission through the system. An oscilloscope is employed at the receiving end of the system, the sweep of which is synchronized with the frequency sweep of the frequency swept test video signal.

If substantial amplitude distortion is present at radio and/or intermediate frequencies in the system, the line traces obtained upon the oscilloscope for each carrier frequency will be very materially different from each other and will depart substantially for most such intermediate carrier frequencies from straight horizontal lines. When the amplitude distortion is substantially equalized, or eliminated, at radio frequencies, or at intermediate frequencies, the oscilloscope traces for the several intermediate frequency carrier frequencies become more nearly straight, superimposed lines. The present invention, therefore, proposes the addition, at the terminal receiving station, of an adjustable radio frequency equalizer 18, as shown in Fig. 1 of the accompanying drawings, or of an adjustable intermediate frequency equalizer 18′, as shown in Fig. 1A of the accompanying drawings. When the equalizer has been adjusted, by means of the method of the present invention, to substantially compensate for the cumulative amplitude distortion of the over-all system, it becomes an integral component of the system. An elementary discussion of equalization is given in chapter XII, volume II of the text book entitled "Communication Networks" by E. A. Guillemin, published by John Wiley and Sons, New York city, 1937. Briefly, it comprises, merely, the insertion of a circuit component having a transmission characteristic such that when combined with that of the circuit to be equalized no distortion remains. For an amplitude equalizer, for example, the circuit equipped with a suitably designed equalizer will amplify and/or attenuate all frequencies within the operating frequency range by the same amount so that the combination is then said to have no amplitude distortion.

The method of the invention will be more readily understood in connection with the detailed description of preferred illustrative embodiments thereof given hereinbelow in connection with the accompanying drawings, in which.

Figure 1:
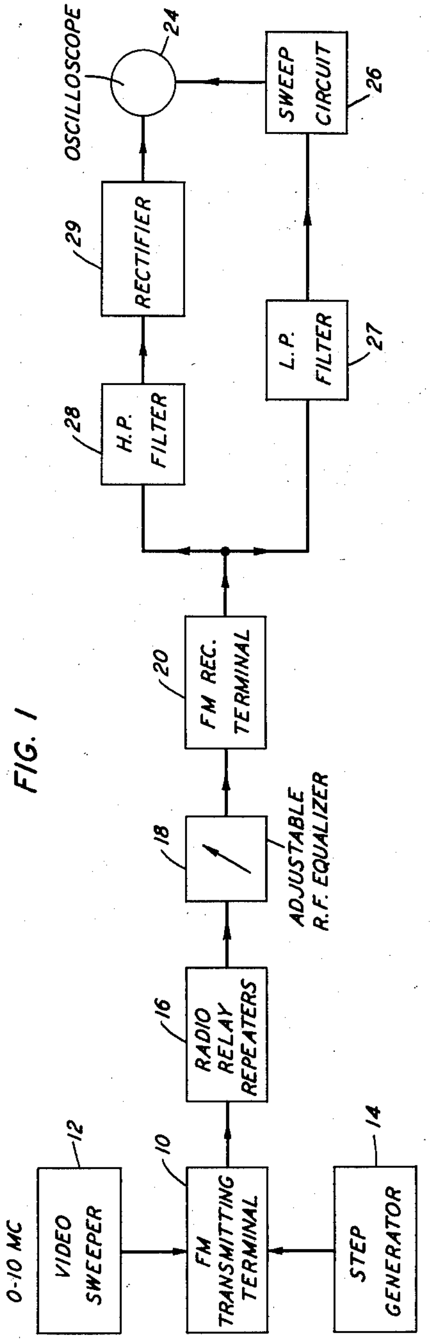
Fig. 1 is a schematic block diagram of a system employing the principles of the invention.

In more detail, in Fig. 1, unit 10 can be a regular frequency modulation radio transmitter unit, as indicated in the above-mentioned Thayer et al. and Clutts articles, and as described in detail in the above-mentioned Friis and Franz articles. Likewise, unit 16 can represent the chain of radio relay repeaters interconnecting the transmitting and receiving terminals of the radio relay system, unit 20 can be a regular frequency modulation receiving unit and unit 24 can be a standard oscilloscope indicator. Interposed between units 20 and 24, are a high pass filter unit 28 and rectifier unit 29. A low pass filter 27 can, at the output of the video amplifier in unit 20, isolate the relatively low frequency corresponding to the sweeping rate of unit 12 and sweep circuit 26, controlling the horizontal sweep of oscilloscope 24, can thereby be synchronized with the sweep of the test video signal.

Unit 12 is a video sweeper and is adapted to provide a constant amplitude signal which sweeps over the video frequency range normally used by the over-all system, which, for example, can be from zero to ten megacycles, inclusive. Unit 12 can, therefore, comprise a control voltage wave generator and an oscillator. By way of example, the control voltage wave generator can supply a suitable sawtooth voltage wave, or some similar predetermined shape of wave, to the repeller anode of a velocity variation oscillator tube employed as the oscillator. The repetition rate of the sweep provided by the generator can be, for example, 60 per second. The resulting, frequency-swept, voltage output of unit 12 is applied to unit 10 so as to frequency modulate its carrier.

Step generator unit 14 provides a stepped voltage wave to change the intermediate frequency carrier frequency about which frequency modulation corresponding to the video test sweep signal provided by unit 12 takes place. For a nominal median intermediate frequency carrier of 70 megacycles, the voltage wave from unit 14, can by way of example, be proportioned to step the carrier frequency of the oscillator in unit 10 which produces the intermediate carrier frequency, through the values 66, 68, 70, 72, and 74 megacycles, inclusive, respectively. The step generator can be a manually operated, stepped, potentiometer with a suitable source of voltage bridged across it, for slow changes from one carrier to the next, or it can include a motor driven, voltage stepping, potentiometer, or it can include an electronically operated, voltage stepping, circuit of any of the numerous types well known to those skilled in the art.

The frequency swept video test signal superimposed in turn upon the several intermediate frequency carriers resulting from the action of the stepping circuit 14 can be employed to modulate a radio frequency carrier which can be, for example, in the neighborhood of 4000 megacycles, which latter carrier is then transmitted over the radio relay circuit to be tested. The composite test signal is received and demodulated in unit 20 to recover the intermediate frequency signals which are further demodulated in unit 20 to recover the video signals resulting from sweeping. The latter are applied to the vertical deflecting plates of the cathode ray oscilloscope 24 through high pass filter unit 28 and rectifier unit 29. A horizontal sweep voltage supplied by circuits 26 and synchronized by the signal component isolated by filter 27, as described above, is applied to the horizontal deflection plates of oscilloscope 24. An adjustable radio frequency equalizer 18 is provided just preceding the unit 20 in the circuit of Fig. 1 for the purpose of equalizing radio frequency and/or intermediate frequency amplitude distortion in the system as will be explained in more detail below.

Figure 1A:
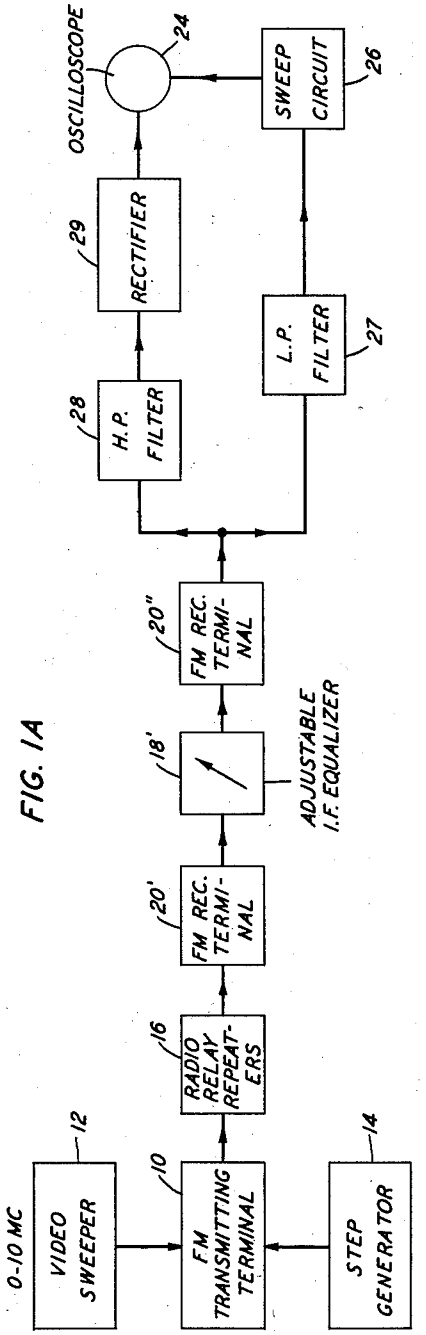
Fig. 1A illustrates a modification of the system of Fig. 1.

Fig. 1A shows a rearrangement of the apparatus of Fig. 1 in which the adjustable intermediate frequency equalizer 18′ takes the place of the radio frequency equalizer 18 of Fig. 1. Unit 20 of Fig. 1 is, in Fig. 1A, divided into two portions 20′ and 20″, the first portion 20′ comprising the receiving converter which converts the radio frequency signal to intermediate frequency and the second portion 20″ comprising the remainder of the unit 20 of Fig. 1. The other units of Fig. 1A can be identical with the correspondingly numbered units of Fig. 1.

Figure 2:
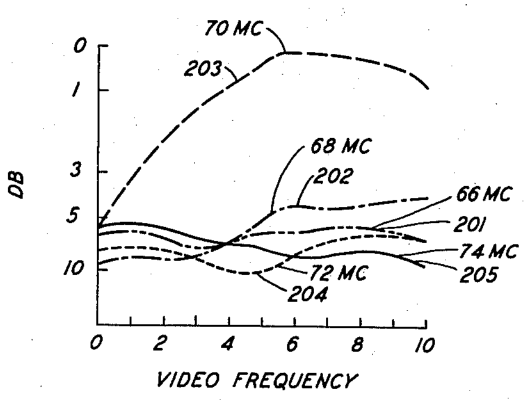
Fig. 2 illustrates the oscilloscope traces obtained with the system of Fig. 1 when a substantial degree of amplitude distortion is present at radio and/or intermediate frequencies, in the system.

Typical oscilloscope traces obtained with substantial radio and/or intermediate frequency amplitude distortion present in the system are shown in Fig. 2, the five traces 201 to 205, inclusive, of Fig. 2 corresponding to intermediate carrier frequencies of 66, 68, 70, 72 and 74 megacycles, respectively. The vertical scale designated DB refers to relative amplitude of the variations in the response curves due to distortion.

Figure 3:
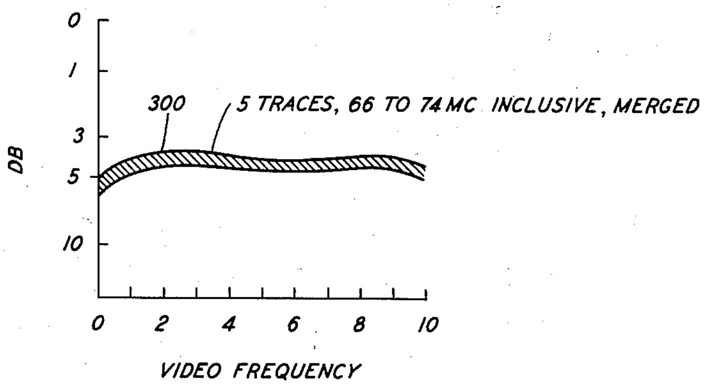
Fig. 3 illustrates the oscilloscope traces obtained with the system of Fig. 1 when the amplitude distortion at radio and/or intermediate frequencies has largely been eliminated from the system.

Elimination or equalization of substantially all radio and/or intermediate frequency amplitude distortion in the system, which can be effected, for example, by appropriate adjustment of the suitably adjustable radio frequency equalizer 18 of Fig. 1, or a similar intermediate frequency equalizer 18′ of Fig. 1A, will result in the five traces of Fig. 2 becoming substantially flat, superimposed traces, as indicated by the single, vertically broad, trace 300 of Fig. 3.

Both theoretical analysis and the results obtained by actual tests show that, for the tests above described, the frequency deviation, defined as the maximum deviation in one direction of the carrier frequency from its unmodulated value, resulting from the applied baseband modulating signal, must be kept small if the video response is to accurately represent the transmission amplitude characteristic. For example, if the frequency deviation is made ± 400 kilocycles, in the above-described illustrative systems, accurate representation of the over-all transmission amplitude characteristic of the system under test will be obtained by the method of the invention described in detail above. The added equalizer 18 of Fig. 1, when adjusted by means of the method of the present invention to substantially compensate for the cumulative amplitude distortion of the over-all system becomes, as mentioned above, an integral component of the over-all system. A number of suitable forms of wave-guide and coaxial line equalizers for use in very high frequency systems of the type described in the above-mentioned articles by Thayer et al. and by Clutts are known to those skilled in the art and will not, therefore, be described in detail here. By way of example, one type of wave-guide amplitude equalizer is disclosed and explained in United States Patent 2,531,447, granted November 28, 1950, to W. D. Lewis, see particularly column 2, line 47 through column 3, line 36, as well as the related structures of Figs. 10, 15 and 20 of the patent. Intermediate frequency amplitude equalizers can be designed in accordance with the classical theory for "lumped element" structures (i. e., structures employing discrete coils, condensers, and resistors). The usual precautions to avoid unwanted effects of distributed capacity, inductance and resistance should, of course, be observed, in accordance with design methods well understood by those skilled in the art. In view of the highly developed state of this art, no detailed description of equalizer 18′ of Fig. 1A is deemed necessary here. Units 10, 16, 20 and 24 of Fig. 1 can be standard components of the system being tested as can also units 20′ and 20″ of Fig. 1A, the latter two units together comprising two portions of unit 20 separated to permit the insertion of adjustable equalizer 18′ in a portion of the circuit of unit 20 in which the signals are being transmitted at intermediate frequencies. The remaining units are, of course, provided for use in carrying out the method of the present invention for determining and correcting the cumulative amplitude distortion of the over-all system and, except for the variable equalizers, as described above, are removed and replaced by the standard units as required for the particular system for normal operation as described, for example, in the above-mentioned articles by Thayer et al. and by Clutts.

A further consideration to be borne in mind is that a radio frequency and/or an interediate frequency transmission amplitude characteristic having odd order symmetry about the carrier will produce no distortion in the video frequency band. As a practical matter, where the carrier is shifted to several positions throughout the frequency region of interest, as in the above-described method in accordance with the principles of the invention, only a substantially straight line transmission amplitude characteristic (which can obviously have any slope), will produce no baseband distortion. Thus, after correction of the baseband, or video frequency, distortion as described above, it is advisable to check the equalizer, inserted to effect the correction, for a possible inclined straight line transmission amplitude characteristic. Such a characteristic may be objectionable from the noise margin viewpoint, particularly if overloading at the higher frequency end of the signal frequency band is likely to be encountered. Should the inserted equalizer be found to have such an undesirable amplitude characteristic, an additional equalizing section having a compensating straight line amplitude characteristic can, obviously, be added to the first equalizer without introducing substantial baseband or video frequency distortion.

In the above illustrative systems, a radio frequency transmission system was employed. Obviously, if a coaxial line or wave-guide line capable of efficiently transmitting the intermediate frequency band employed is substituted for the radio portions of the system, there will be no need to introduce radio frequencies at any point in the system. The application of the principles of the invention to a system transmitting the intermediate frequencies per se is, of course, apparent to anyone skilled in the art.

Numerous and varied other applications of the principles of this invention, as described and illustrated above, will readily occur to those skilled in the art. The above preferred embodiments in accordance with said principles are merely illustrative and by no means exhaustively illustrate the potentialities of the invention.

What is claimed is:

1. In a radio relay transmission system for frequency modulation signals, means for correcting distortion of the baseband or video frequency output resulting from radio frequency and intermediate frequency amplitude distortion in the system, which comprises means at the transmitting end of said system for generating and transmitting over said system a test signal, the frequency of which is recurrently swept through the video frequency band to be transmitted by the system, said means including means for generating a plurality of intermediate frequency carrier frequencies in succession, said carrier frequencies being spaced throughout a frequency region comparable in width to that of said video frequency band, means for modulating said successive carrier frequencies with said frequency swept test signal, means for generating a suitable radio frequency carrier and modulating said radio frequency carrier by said successive modulated intermediate frequency carrier frequencies, means at the receiving end of said system for receiving said modulated radio frequency carrier after transmission over said radio relay system and demodulating the same to recover said successive modulated intermediate frequency carrier frequencies, means to demodulate said successive intermediate frequency carrier frequencies to recover said frequency swept test video signal, means to simultaneously visually indicate by juxtaposed traces on an indicator the amplitude versus frequency characteristic of said frequency swept test video signal for each of said successive intermediate frequency carrier frequencies and means for adjustably equalizing the amplitude versus frequency characteristic of said system until the said traces for the frequency swept test video signals recovered from all of the said successive intermediate frequency carrier frequencies are horizontal, substantially superimposed traces.

2. The means for correcting distortion of the baseband or video frequency of claim 1 wherein the means for adjustably equalizing the amplitude versus frequency characteristic of said system comprises an adjustable radio frequency equalizer.

3. The means for correcting distortion of the baseband or video frequency of claim 1 wherein the means for adjustably equalizing the amplitude versus frequency characteristic of said system comprises an adjustable intermediate frequency equalizer.

4. In a relay transmission system for frequency modulation signals, means for correcting distortion of the baseband or video frequency output resulting from carrier frequency amplitude distortion in the system, which comprises means at the transmitting end of said system for generating and transmitting over said system a test signal, the frequency of which is recurrently swept through the video frequency band to be transmitted by the system, said means including means for generating a plurality of carrier frequencies in succession, said carrier frequencies being spaced throughout a frequency region comparable in width to that of said video frequency band, means for modulating said successive carrier frequencies with said frequency swept test video signal, means at the receiving end of said system for receiving said modulated carrier frequencies after transmission over said relay system, means to demodulate said successive carrier frequencies to recover said frequency swept test video signal, means to simultaneously visually indicate by juxtaposed traces on an indicator the amplitude versus frequency characteristic of said frequency swept test video signal for each of said successive carrier frequencies, and means for adjustably equalizing the amplitude versus frequency characteristic of said system until the said traces for the frequency swept test video signal recovered from all of the said successive carrier frequencies are horizontal, substantially superimposed traces.

5. In a radio relay transmission system for broad baseband frequency modulation signals, means for detecting unwanted amplitude distortion of the baseband or video frequency output resulting from radio frequency and intermediate frequency amplitude distortion in the system which comprises means for generating and transmitting over said system a test signal, the frequency of which is recurrently swept through the video frequency band to be transmitted by the system, said means including means for generating a plurality of intermediate frequency carrier frequencies in succession, said carrier frequencies being spaced throughout a frequency region comparable in width to that of said video frequency band, means for modulating said successive carrier frequencies with said frequency swept test signal, means for generating a suitable radio frequency carrier and modulating said radio frequency carrier by said successive modulated intermediate frequency carrier frequencies, means at the receiving end of said system for receiving said modulated radio frequency carrier after transmission over said radio relay system and demodulating the same to recover said successive modulated intermediate frequency carrier frequencies, means to demodulate said successive intermediate frequency carrier frequencies to recover said frequency swept test video signal, means for deriving synchronizing signals from said test video signal after demodulation of said carrier frequencies, means for utilizing said synchronizing signals to control an indicating device, and means to simultaneously visually indicate by juxtaposed traces on said indicator the amplitude versus frequency characteristic of said frequency swept test video signal for each of said successive intermediate frequency carrier frequencies to obtain an indication of the amplitude distortion introduced by the radio frequency and intermediate frequency portions of said radio relay system.

6. In a relay transmission system for broad baseband frequency modulation signals, means for detecting unwanted amplitude distortion of the baseband or video frequency output resulting from carrier frequency amplitude distortion in the system which comprises means at the transmitting end of said system for generating and transmitting over the system a test signal, the frequency of which is recurrently swept through the video frequency band to be transmitted by the system, said means including means for generating a plurality of carrier frequencies in succession, said carrier frequencies being spaced throughout a frequency region comparable in width to that of said video frequency band, means for modulating said successive carrier frequencies with said frequency swept test video signal, means at the receiving end of said system for receiving said modulated carrier frequencies after transmission over said relay system, means to demodulate said successive carrier frequencies to recover said frequency swept test video signal, means for deriving synchronizing signals from said test video signal after demodulation of said carrier frequencies, means for utilizing said synchronizing signals to control an indicating device, and means to simultaneously visually indicate by juxtaposed traces on said indicator the amplitude versus frequency characteristic of said frequency swept test video signal for each of said successive carrier frequencies to obtain an indication of the amplitude distortion introduced by the carrier frequency portions of said relay system.

References Cited in the file of this patent

UNITED STATES PATENTS

| | | |
|---|---|---|
| 2,579,160 | Stribling, Jr., et al. | Dec. 18, 1951 |
| 2,588,376 | Fox | Mar. 11, 1952 |